United States Patent
Ueki et al.

(10) Patent No.: US 9,939,038 B2
(45) Date of Patent: Apr. 10, 2018

(54) VIBRATION-DAMPING DEVICE

(71) Applicant: BRIDGESTONE CORPORATION, Tokyo (JP)

(72) Inventors: Akira Ueki, Tokyo (JP); Shingo Oono, Tokyo (JP); Hirokazu Watai, Tokyo (JP); Masakazu Nagasawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 15/029,654

(22) PCT Filed: Oct. 15, 2014

(86) PCT No.: PCT/JP2014/077410
§ 371 (c)(1),
(2) Date: Apr. 15, 2016

(87) PCT Pub. No.: WO2015/060171
PCT Pub. Date: Apr. 30, 2015

(65) Prior Publication Data
US 2016/0245364 A1    Aug. 25, 2016

(30) Foreign Application Priority Data
Oct. 25, 2013   (JP) .................. 2013-222235

(51) Int. Cl.
*F16F 13/10*    (2006.01)
*B60K 5/12*    (2006.01)
*F16F 13/08*    (2006.01)

(52) U.S. Cl.
CPC .......... *F16F 13/107* (2013.01); *B60K 5/1208* (2013.01); *F16F 13/08* (2013.01); *F16F 2230/00* (2013.01)

(58) Field of Classification Search
CPC .......... F16F 13/08; F16F 13/10; F16F 13/105; F16F 13/107; F16C 1/16
See application file for complete search history.

(56) References Cited

U.S. PATENT DOCUMENTS 3,323,550 A * 6/1967 Lee, II .................. F15C 1/02
                                           137/809
4,466,514 A * 8/1984 Molders ................ F16F 9/344
                                           188/320

(Continued)

FOREIGN PATENT DOCUMENTS

EP    2 221 503 A1    8/2010
EP    2 535 615 A1    12/2012

(Continued)

OTHER PUBLICATIONS

International Search Report of PCT/JP2014/077410, dated Nov. 25, 2014. [PCT/ISA/210].

(Continued)

*Primary Examiner* — Thomas J Williams
(74) *Attorney, Agent, or Firm* — Sughrue Mion, PLLC

(57) ABSTRACT

Swirl chamber units (31) allowing a first liquid chamber (14) and a second liquid chamber (15) to communicate with each other are formed in a partitioning member of a vibration-damping device (10) of the present invention. Each swirl chamber unit (31) includes a first communication hole (32a) opening to the first liquid chamber (14), and a second communication hole (32b) opening to the second liquid chamber (15); a first swirl chamber (33a) communicating with the first liquid chamber (14) via the first communication hole (32a), and a second swirl chamber (33b) communicating with the second liquid chamber (15) via the second communication hole (32b); and a flow regulation passage (34) that allows the first swirl chamber (33a) and the second swirl chamber (33b) to communicate with each other and (Continued)

opens to the swirl chambers (33a, 33b) in circumferential directions of the respective swirl chambers (33a, 33b). The first and second swirl chambers (33a, 33b) are formed so that a liquid flowing into the interiors of the chambers from the flow regulation passage (34) is swirled according to the flow speed of the liquid. By including the configuration as described above, simplification of structure and facilitation of manufacture can be achieved, while guaranteeing the product characteristics of the vibration-damping device.

6 Claims, 5 Drawing Sheets

(56) References Cited

U.S. PATENT DOCUMENTS

| | | | |
|---|---|---|---|
| 4,811,934 A | 3/1989 | Bebermeier et al. | |
| 4,852,864 A | 8/1989 | Bitschkus et al. | |
| 5,263,693 A * | 11/1993 | Klein | F16F 13/105 267/140.13 |
| 2010/0213650 A1 | 8/2010 | Katayama et al. | |
| 2016/0131219 A1 * | 5/2016 | Ueki | F16F 13/107 267/140.13 |
| 2016/0298716 A1 * | 10/2016 | Ueki | F16F 13/107 |
| 2017/0030428 A1 * | 2/2017 | Ueki | B60K 5/1208 |

FOREIGN PATENT DOCUMENTS

| | | |
|---|---|---|
| EP | 3 026 292 A1 | 6/2016 |
| JP | 57-118921 A | 7/1982 |
| JP | 61-59941 U | 4/1986 |
| JP | 62-28543 A | 2/1987 |
| JP | 1-98722 A | 4/1989 |
| JP | 2007-120598 A | 5/2007 |
| JP | 2010-196747 A | 9/2010 |
| JP | 2012-26510 A | 2/2012 |
| RU | 2 120 389 C1 | 10/1998 |

OTHER PUBLICATIONS

Written Opinion of PCT/JP2014/077410, dated Nov. 25, 2014. [PCT/ISA/237].

* cited by examiner

VIBRATION-DAMPING DEVICE

CROSS REFERENCE TO RELATED APPLICATIONS

This application is a National Stage of International Application No. PCT/JP2014/077410 filed Oct. 15, 2014, claiming priority based on Japanese Patent Application No. 2013-222235, filed Oct. 25, 2013, the contents of all of which are incorporated herein by reference in their entirety.

TECHNICAL FIELD

The present invention relates to a vibration-damping device that is applied to, for example, automobiles, industrial machines, or the like, and absorbs and damps vibrations of vibration generating parts, such as engines.

BACKGROUND ART

As this type of vibration-damping device, for example, the configuration described in the following Patent Document 1 is known. This vibration damping device includes a tubular first attachment member that is coupled to any one of a vibration generating portion and a vibration receiving portion, a second attachment member that is coupled to the other thereof, an elastic body that couples both the attachment members, and a partitioning member that partitions a liquid chamber within the first attachment member having a liquid enclosed therein into a first liquid chamber and a second liquid chamber. This vibration-damping device further includes a first limiting passage and a second limiting passage that allows both the liquid chambers to communicate with each other, a cylinder chamber provided between both the liquid chambers, and a plunger member disposed within the cylinder chamber so as to be movable between an open position and a blocking position within the cylinder chamber.

For example, a plurality of kinds of vibrations having different frequencies, such as an idle vibration and a shake vibration, are input to this vibration-damping device. Thus, in this vibration-damping device, the respective resonant frequencies of the first limiting passage and the second limiting passage are set (tuned) to the respective frequencies of the different kinds of vibration. As the plunger member moves between the open position and the blocking position according to the frequency of an input vibration, a limiting passage through which a liquid flows is switched using the first limiting passage and the second limiting passage.

CITATION LIST

Patent Document

[Patent Document 1] Japanese Unexamined Patent Application Publication No. 2007-120598

SUMMARY OF INVENTION

Technical Problem

However, in the related-art vibration-damping device, there is room for improvement in simplification of structure, and facilitation of manufacture.

Additionally, in the related-art vibration-damping device, for example, when an unintended vibration, such as a fine vibration having a higher frequency and an extremely smaller amplitude than the resonant frequency of a limiting passage determined depending on the passage length, cross-sectional area, or the like of the limiting passage, is input, a dynamic spring constant may increase due to clogging of the limiting passage, which may influence the product characteristics of the vibration-damping device, such as the driving comfort of automobiles.

The invention has been made in view of the aforementioned circumstances, and an object thereof is to provide a vibration-damping device that can achieve simplification of structure and facilitation of manufacture, while guaranteeing product characteristics.

Solution to Problem

In order to solve the above problems and achieve such an object, a vibration-damping device of the invention includes a tubular first attachment member coupled to any one of a vibration generating part and a vibration receiving part, and a second attachment member coupled to the other thereof; an elastic body coupling both of the attachment members; and a partitioning member that partitions a liquid chamber within the first attachment member having a liquid enclosed therein into a first liquid chamber and a second auxiliary liquid chamber. At least any one of both liquid chambers of the first liquid chamber and the second liquid chamber has the elastic body on a portion of the wall surface thereof. A swirl chamber unit allowing the first liquid chamber and the second liquid chamber to communicate with each other is formed in the partitioning member. The swirl chamber unit includes a first communication hole opening to the first liquid chamber, and a second communication hole opening to the second liquid chamber; a first swirl chamber communicating with the first liquid chamber via the first communication hole, and a second swirl chamber communicating with the second liquid chamber via the second communication hole; and a flow regulation passage that allows the first swirl chamber and the second swirl chamber to communicate with each other and opens to the swirl chambers in circumferential directions of the respective swirl chambers. The first and second swirl chambers are formed so that a liquid flowing into the interiors of the chambers from the flow regulation passage is swirled according to the flow speed of the liquid.

According to this invention, when a vibration is input and a liquid flows through the swirl chamber unit between both of the liquid chambers, the liquid flows into any one swirl chamber of the first swirl chamber and the second swirl chamber at a sufficiently high flow speed from the flow regulation passage, and is swirled within one swirl chamber. Therefore, for example, the pressure loss of a liquid increases due to an energy loss caused by forming a swirling flow, an energy loss caused by the friction between a liquid and the wall surface of one swirl chamber, or the like, and vibration is absorbed and damped.

Accordingly, for example, when an ordinary vibration, such as an idle vibration or a shake vibration, is input, the vibration can be absorbed and damped according to the flow speed of the liquid, regardless of the frequency of the vibration. Therefore, simplification of structure and facilitation of manufacture can be achieved, while absorbing and damping a plurality of kinds of vibration with mutually different frequencies.

Meanwhile, if the flow speed of a liquid is low, and swirling of the liquid within one swirl chamber is suppressed, the liquid smoothly passes through the interior of one swirl chamber, and a rise in dynamic spring constant is suppressed. Accordingly, for example, when the flow speed of a liquid is lower than that when an ordinary vibration is input, such as when an unintended vibration, such as a fine vibration having a higher frequency and an extremely smaller amplitude than an ordinary vibration, is input, it is possible to suppress a rise in dynamic spring constant, and the product characteristics of this vibration-damping device can be easily guaranteed.

Additionally, the first communication hole allows the first swirl chamber and the first liquid chamber to communicate with each other, and the second communication hole allows the second swirl chamber and the second liquid chamber to communicate with each other. Therefore, the aforementioned effects are obtained with respect to both of a liquid that flows from the first liquid chamber through the swirl chamber unit toward the second liquid chamber and a liquid that flows from the second liquid chamber through the swirl chamber unit toward the first liquid chamber, and devices to which the vibration-damping device is applicable can be prevented from being restricted.

Additionally, the flow regulation passage allows the first swirl chamber and the second swirl chamber to communicate with each other, and opens to the respective swirl chambers in the circumferential direction of the respective swirl chambers, and the flow regulation passage opening into the first and second swirl chambers is common to both. Therefore, it is possible to make this swirl chamber unit compact, for example, compared to a configuration in which a flow regulation passage allowing the first swirl chamber and the second liquid chamber to communicate with each other and a flow regulation passage allowing the second swirl chamber and the first liquid chamber to communicate with each other are formed, respectively, and the partitioning member can be prevented from being bulky.

Here, the partitioning member may partition the liquid chamber in an axis direction of the first attachment member, and the first and second swirl chambers may be arranged side by side in the partitioning member so that respective central axes thereof become parallel to an axis of the first attachment member.

In this case, the first and second swirl chambers are arranged side by side in the partitioning member partitioning the liquid chamber in the axis direction of the first attachment member so that respective central axes thereof become parallel to the axis of the first attachment member. Therefore, it is possible to reliably constrain the size of the swirl chamber unit in the axis direction of the first attachment member, and the partitioning member can be prevented from being bulky in the axis direction of the first attachment member.

Additionally, the first and second communication holes may open into the first and second swirl chambers from end surfaces that face central axis directions of the respective swirl chambers, among wall surfaces that define the first and second swirl chambers.

In this case, since the first and second communication holes open into the first and second swirl chambers from the end surfaces of the first and second swirl chambers, it is possible to stably produce the swirling flow of a liquid within the first and second swirl chambers, and the pressure loss of the liquid can be effectively increased.

Additionally, the first and second communication holes may be arranged coaxially with the respective central axes of the first and second swirl chambers.

In this case, since the first and second communication holes are arranged coaxially with the respective central axes of the first and second swirl chambers, it is possible to guarantee that the length in the swirling direction of the swirling flow of a liquid formed by the first and second swirl chambers is long, thereby making it easy to cause the liquid to stay within the first and second swirl chambers, and the pressure loss of the liquid can be more effectively increased.

Additionally, the partitioning member is provided with the limiting passage that allows both of the liquid chambers to communicate with each other and has a resonant frequency equal to the frequency of first vibration. The resonant frequency of the flow regulation passage may be equal to the frequency of second vibration having a higher frequency than the first vibration.

In this case, at the time of the input of the first vibration, a large amount of liquid per unit time flows into one swirl chamber from the flow regulation passage, for example, according to the amplitude of this first vibration, or the like. In this case, for example, a flow is formed so as to be swirled within the interior of one swirl chamber due to the inertia force of the liquid that has flowed into the interior of the swirl chamber, and this flow develops and becomes a swirl, whereby the flow resistance between both the liquid chambers through the swirl chamber unit rises. Accordingly, a liquid preferentially flow through the limiting passage between both the liquid chambers, and resonance is produced in the limiting passage and the first vibration is absorbed and damped.

Meanwhile, at the time of the input of the second vibration, a small amount of liquid per unit time flows into one swirl chamber from the flow regulation passage, for example, according to the amplitude of this second vibration, or the like. Therefore, a swirl within one swirl chamber is not sufficiently developed by the liquid that has flowed into the interior of the swirl chamber, and the flow resistance between both the liquid chambers through the swirl chamber unit is suppressed to be low. Therefore, it is possible to actively circulate a liquid in the swirl chamber unit, and resonance is produced within the flow regulation passage and the second vibration is absorbed and damped.

Advantageous Effects of Invention

According to this invention, simplification of structure and facilitation of manufacture can be achieved, while guaranteeing the product characteristics of the vibration-damping device.

DESCRIPTION OF EMBODIMENTS

Hereinafter, an embodiment of a vibration-damping device related to the invention will be described, referring to FIGS. 1 to 6.

Figure 1:
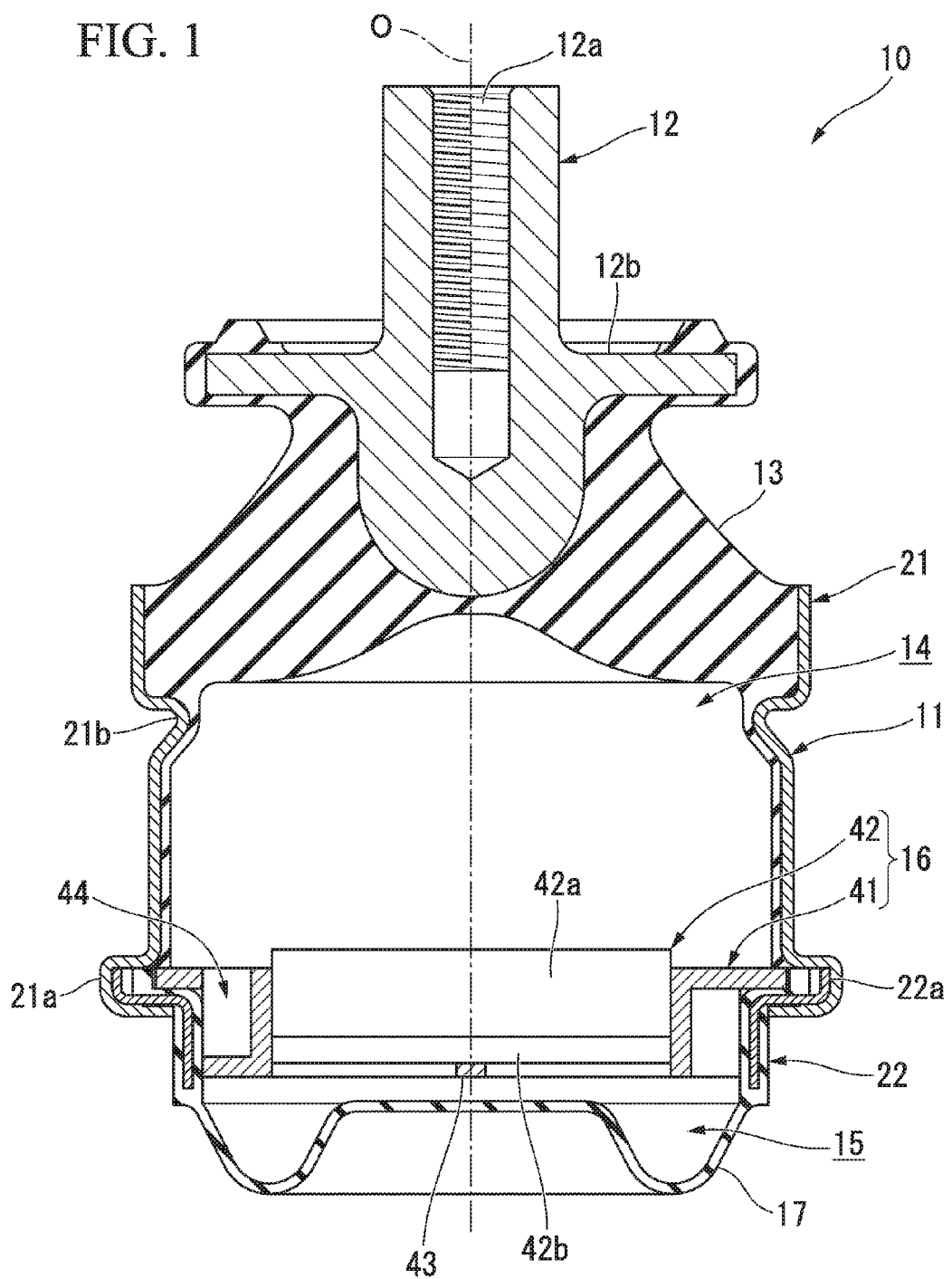
FIG. 1 is an overall longitudinal sectional view excluding a swirl chamber member of a partitioning member in a vibration-damping device shown as an embodiment related to the invention.

The vibration-damping device 10, as is shown in FIG. 1, includes a tubular first attachment member 11 that is coupled to any one of a vibration generating part and a vibration receiving part, a second attachment member 12 that is coupled to the other thereof, an elastic body 13 that couples both the attachment members 11 and 12 together, and a partitioning member 16 that partitions a chamber within the first attachment member 11 in which a liquid is enclosed, into a main liquid chamber (first liquid chamber) 14 that has the elastic body 13 as a portion of the wall surface thereof, and an auxiliary liquid chamber (second liquid chamber) 15.

In the shown example, the second attachment member 12 is formed in a pillar shape, the elastic body 13 is formed in a tubular shape, and the first attachment member 11, the second attachment member 12, and the elastic body 13 are disposed coaxially with a common axis. Hereinafter, this common axis is referred to as a principal axis O (an axis of the first attachment member), a main liquid chamber 14 side along a direction (an axis direction of the first attachment member) of the principal axis O is referred to as one side (a first side), an auxiliary liquid chamber 15 side is referred to as the other side (a second side), and a direction orthogonal to the principal axis O is referred to as a radial direction.

In a case where the vibration-damping device 10 is mounted on, for example, an automobile, the second attachment member 12 is coupled to the engine as the vibration generating part. Meanwhile, the first attachment member 11 is coupled to a vehicle body as the vibration receiving part via a bracket (not shown), and prevents the vibration of the engine from being transmitted to the vehicle body. The vibration-damping device 10 is of a liquid-enclosed type in which, for example, a liquid, such as ethylene glycol, water, or silicone oil, is enclosed in a liquid chamber of the first attachment member 11.

The first attachment member 11 includes a first-side outer tube body 21 located on first side along the direction of the principal axis O, and an second-side outer tube body 22 located on the second side along the direction of the principal axis O.

The elastic body 13 is coupled to first-side end of the first-side outer tube body 21 in a liquid-tight state, and one opening of the first-side outer tube body 21 is blocked by the elastic body 13. The second-side end 21a of the one outer tube bodies 21 is formed with a larger diameter than the other portions. The interior of the first-side outer tube body 21 serves as the main liquid chamber 14. In addition, an annular groove 21b that extends continuously over a whole circumference is formed in the portion of the first-side outer tube body 21 that is connected from the second side opposite to the portion thereof to which the elastic body 13 is coupled.

The diaphragm 17 is coupled to the second-side end of the second-side outer tube body 22 in a liquid-tight state, and the other opening of the second-side outer tube body 22 is blocked by the diaphragm 17. A first-side end 22a of the second-side outer tube body 22 is formed with a larger diameter than the other portions, and is fitted into the second-side end 21a of the first-side outer tube body 21. Moreover, the partitioning member 16 is fitted into the second-side outer tube body 22, and the auxiliary liquid chamber 15 is provided between the partitioning member 16 and the diaphragm 17. In addition, the second-side outer tube body 22 is covered substantially over the entire region with a rubber membrane formed integrally with the diaphragm 17.

A female thread part 12a is formed coaxially with the principal axis O in first-side end surface of the second attachment member 12. The second attachment member 12 protrudes from the first attachment member 11 to the first side.

A flange part 12b that protrudes toward a radial outer side and continuously extends over a whole circumference is formed in the second attachment member 12. The flange part 12b is separated from first-side end edge of the first attachment member 11 to the first side.

The elastic body 13 is formed of, for example, a rubber material or the like capable of being elastically deformed, and is formed in a tubular shape that has a gradually enlarged diameter from the first side toward the second side. First-side end of the elastic body 13 is coupled to the second attachment member 12, and the second-side end thereof is coupled to the first attachment member 11.

In addition, an inner peripheral surface of the first-side outer tube body 21 of the first attachment member 11 is covered substantially over the entire region with the rubber membrane formed integrally with the elastic body 13.

The partitioning member 16 partitions the liquid chamber in the direction of the principal axis O. The partitioning member 16 includes a mounting member 41 and a swirl chamber member 42. The mounting member 41 is mounted on the first attachment member 11. The mounting member 41 is formed in an annular shape coaxially with the principal axis O, and is fitted into the second-side outer tube body 22. A support member 43 is provided within the second-side end of the mounting member 41. The support member 43 is formed in a cross shape in a plan view in which the vibration-damping device 10 is seen from the direction of the principal axis O. The swirl chamber member 42 is liquid-tightly fitted into the mounting member 41. The support member 43 supports the second-side end surface of the swirl chamber member 42.

Here, a swirl chamber unit 31 that allows both the liquid chambers 14 and 15 to communicate with each other, and a limiting passage 44 are formed in the partitioning member 16.

Figure 2:
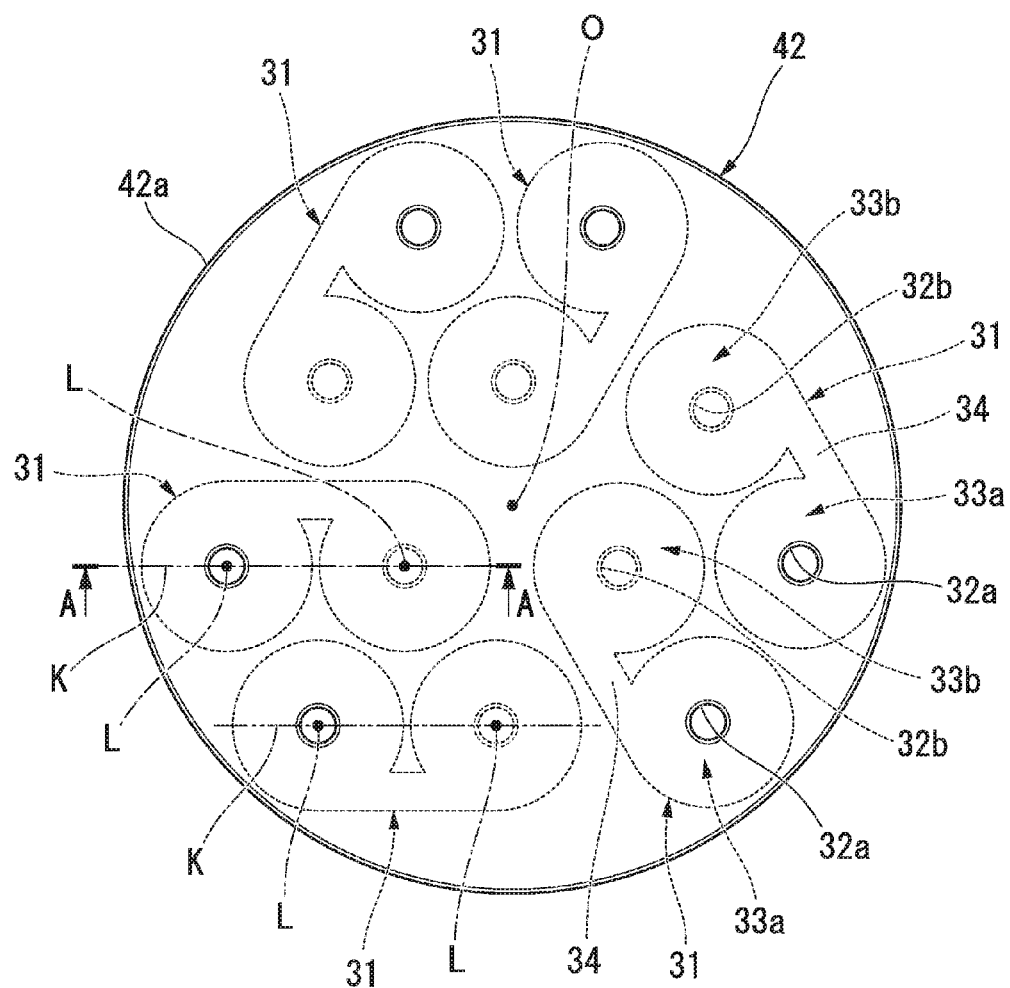
FIG. 2 is a plan view of the swirl chamber member of the vibration-damping device shown in FIG. 1.
Figure 3:
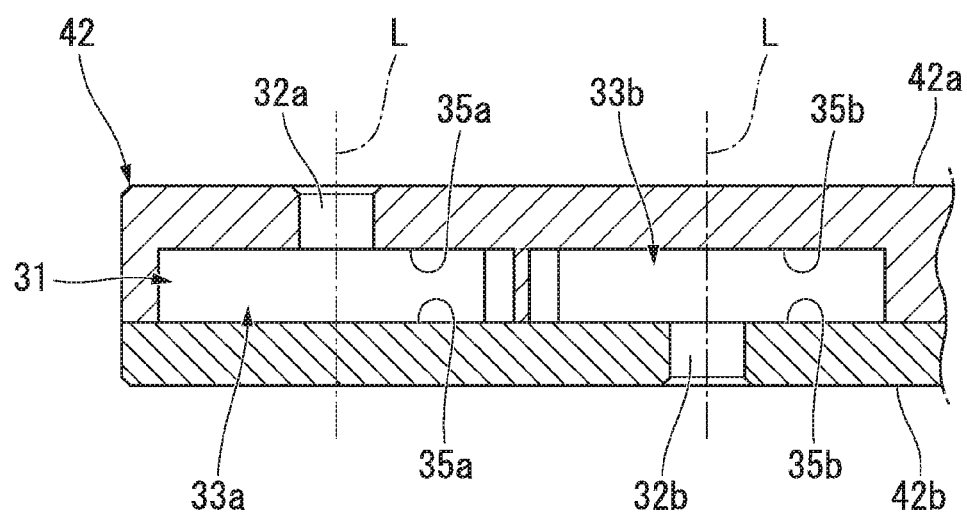
FIG. 3 is a sectional view as seen from arrow A-A of FIG. 2.

The swirl chamber unit 31 is formed in the swirl chamber member 42. The swirl chamber unit 31, as shown in FIGS. 2 and 3, includes a first communication hole 32a that opens to the main liquid chamber 14, a second communication hole 32b that opens to the auxiliary liquid chamber 15, a first swirl chamber 33a that communicates with the main liquid chamber 14 through the first communication hole 32a, a second swirl chamber 33b that communicates with the auxiliary liquid chamber 15 through the second communication hole 32b, and a flow regulation passage 34 that allows the first swirl chamber 33a and the second swirl chamber 33b to communicate with each other.

The first and second swirl chambers 33a and 33b become disk-like spaces that form a circular shape in the plan view as seen from the direction of the principal axis O.

The first and second swirl chambers 33a and 33b are formed with the same shape as each other and with the same size as each other. The first and second swirl chambers 33a and 33b are arranged side by side so that their respective central axes L become parallel to each other. The respective central axes L are parallel to the principal axis O. The first and second swirl chambers 33a and 33b are arranged on the same plane orthogonal to the principal axis O.

Figure 4:
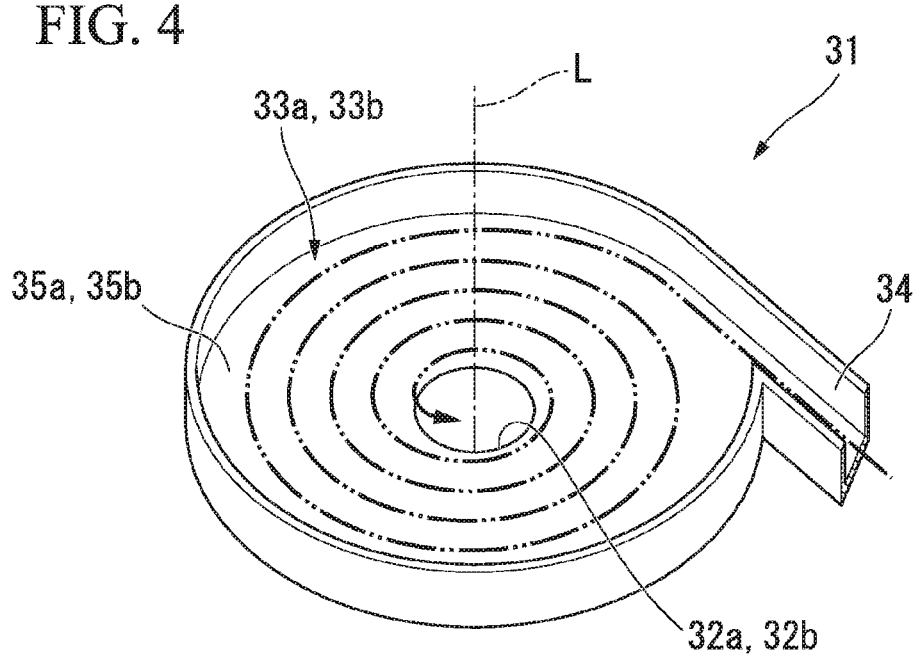
FIG. 4 is a schematic view of main parts of a swirl chamber unit shown in FIGS. 2 and 3, and is a view showing the flow of a liquid when the flow speed of the liquid that flows into first and second swirl chambers from a flow regulation passage is high.
Figure 5:
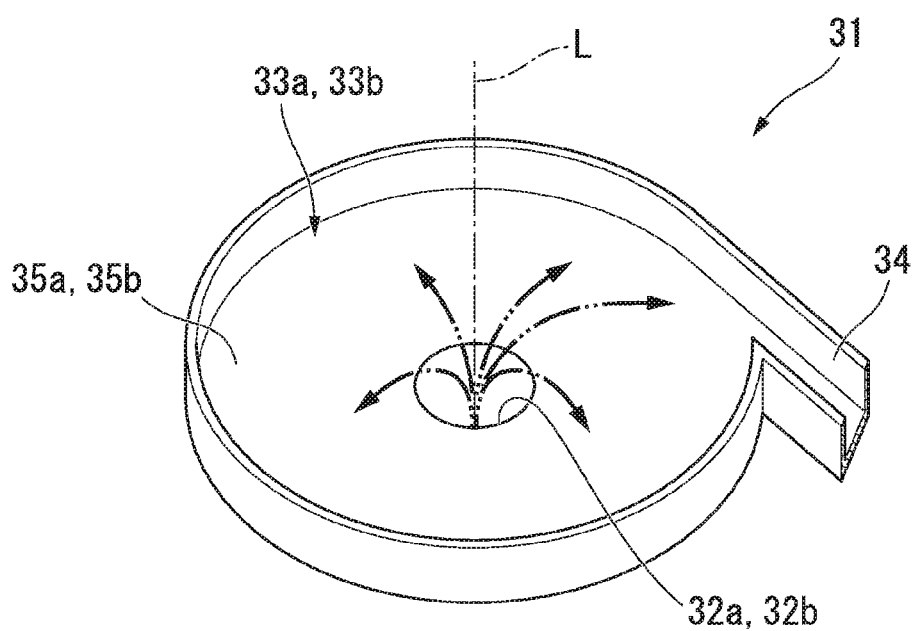
FIG. 5 is a schematic view of the main parts of the swirl chamber unit shown in FIGS. 2 and 3, and is a view showing the flow of a liquid that flows into the first and second swirl chambers from first and second communication holes.
Figure 6:
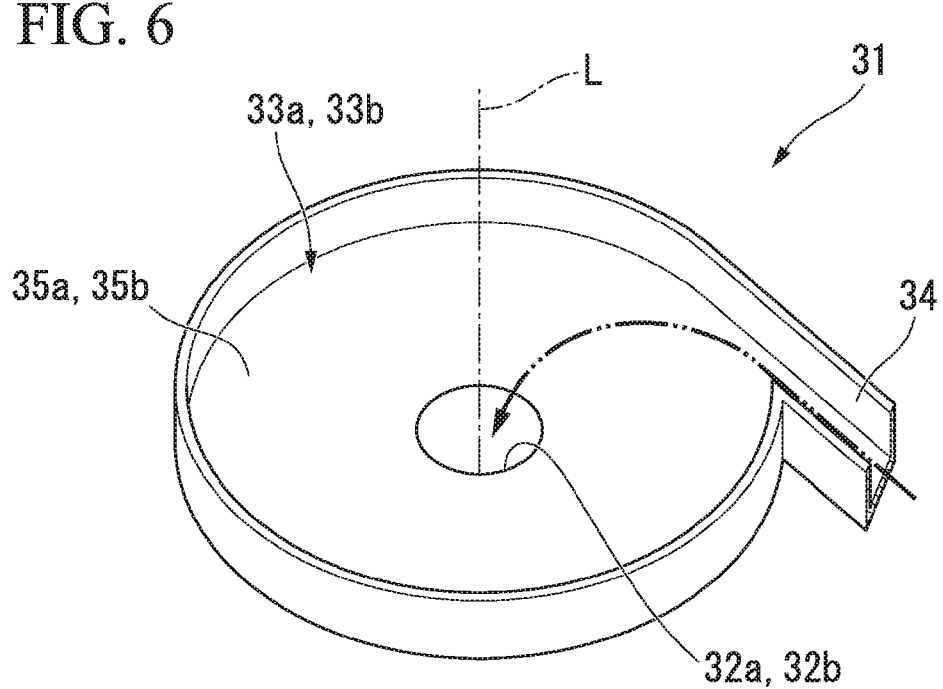
FIG. 6 is a schematic view of the main parts of the swirl chamber unit shown in FIGS. 2 and 3, and is a view showing the flow of the liquid when the flow speed of the liquid that flows into first and second swirl chambers from the flow regulation passage is low.

The first and second swirl chambers 33a and 33b are formed so that a liquid that has flowed into the interiors of the chambers from the flow regulation passage 34 is swirled around the central axes L, as shown in FIG. 4, according to the flow speed of the liquid. Additionally, the first and second swirl chambers 33a and 33b, as shown in FIG. 5, are formed so that the liquid that has flowed into the interiors of the swirl chambers from the first and second communication holes 32a and 32b is made to pass through the flow regulation passage 34 without being swirled.

Here, each of the first and second swirl chambers 33a and 33b is defined by two end surfaces 35a or 35b in the direction of the central axis L, and a peripheral surface that couples outer peripheral edges of the two end surfaces 35a or 35b, and form a disk-like space. The first or second communication hole 32a or 32b opens to one end surface 35a or 35b of the two end surfaces 35a or 35b that define the first or second swirl chamber 33a or 33b. In the shown example, the first and second communication holes 32a and 32b are arranged coaxially with the central axes L.

The flow regulation passage 34 opens to the first and second swirl chambers 33a and 33b in the circumferential direction around the central axes L of the respective swirl chambers 33a and 33b. In the shown example, the flow regulation passage 34 extends straight. The flow regulation passage 34 extends straight so as to be circumscribed on the first and second swirl chambers 33a and 33b that form circular shapes, in the plan view as seen from the direction of the principal axis O as shown in FIG. 2. In addition, the flow regulation passage 34 extends in a tangential direction so as to be circumscribed on the first and second swirl chambers 33a and 33b, in the plan view as seen from the direction of the principal axis O. The flow regulation passage 34 is parallel to a phantom line K that couples the respective central axes L of the first and second swirl chambers 33a and 33b, in the plan view as seen from the direction of the principal axis O.

Six swirl chamber units 31 configured as described above are formed in the partitioning member 16.

The respective swirl chamber units 31 are arranged on the same plane orthogonal to the principal axis O such that their positions are made different from each other.

In the shown example, three sets of swirl chamber units, each set including two swirl chamber units 31 and 31, are formed in the partitioning member 16.

One set of swirl chamber units 31 and 31 is arranged so that, in the plan view as seen from the direction of the principal axis O, peripheral surface portions of the first or second swirl chambers 33a or 33b on the opposite sides of the flow regulation passages 34 in the respective swirl chamber units 31 face each other and the flow regulation passages 34 in the respective swirl chamber units 31 become parallel to each other. Additionally, one set of swirl chamber units 31 and 31 are arranged in the partitioning member 16 such that their positions in a direction in which the flow regulation passages 34 extend are shifted from each other. By arranging the plurality of swirl chamber units 31 in this way, improvements in space efficiency are further achieved.

Here, the swirl chamber units 31 are provided independently from the limiting passage 44, and as shown in FIG. 1, is formed in an outer peripheral surface of the mounting member 41. The resonant frequency of the limiting passage 44 is equal to the frequency of a shake vibration (a first vibration) (for example, a frequency of 14 Hz or less and an amplitude of greater than ±0.5 mm), and produces resonance (liquid column resonance) with respect to the input of the shake vibration.

The resonant frequency of the limiting passage 44 is lower than the resonant frequency of the flow regulation passage 34. The resonant frequency of the flow regulation passage 34 is equal to the frequency of an idle vibration (second vibration) (a frequency of 14 Hz to 40 Hz and an amplitude of ±0.5 mm or less) having a higher frequency and a smaller amplitude than a shake vibration. The flow regulation passage 34 functions as an orifice that produces resonance (liquid column resonance) with respect to the input of an idle vibration.

The swirl chamber member 42 is split into two split bodies 42a and 42b in the direction of the principal axis O.

In the shown example, the swirl chamber member 42 is split at the second-side end along the direction of the principal axis O.

A concave portion that defines the first and second swirl chambers 33a and 33b and the flow regulation passage 34, and the first communication hole 32a are formed in the split body 42a located on first side in the direction of the principal axis O. The split body 42b located on the second side in the direction of the principal axis O covers the concave portion, which defines the flow regulation passage 34, and defines the first and second swirl chambers 33a and 33b and the flow regulation passage 34, and has the second communication hole 32b.

Next, the operation of the vibration-damping device 10 will be described.

In the vibration-damping device 10, when a shake vibration is input, the plurality of swirl chamber units 31 are designed so that this shake vibration is absorbed and damped by the swirl chamber units 31, respectively.

That is, if a shake vibration is input to the vibration-damping device 10 in the direction of the principal axis O, both the attachment members 11 and 12 are displaced relative to each other, elastically deforming the elastic body 13, and the liquid pressure of the main liquid chamber 14 fluctuates.

Then, according to the amplitude of this shake vibration, the liquid within the main liquid chamber 14 or the auxiliary liquid chamber 15 flows into the second swirl chamber 33b through the first communication hole 32a, the first swirl chamber 33a, and the flow regulation passage 34 and flows into the first swirl chamber 33a through the second communication hole 32b, the second swirl chamber 33b, and the flow regulation passage 34, in large quantities per unit time. That is, as shown by two-dot chain lines in FIG. 4, the liquid of which the flow speed has been raised at the time of the input of a shake vibration flows into the second swirl chamber 33b or the first swirl chamber 33a through the flow regulation passage 34. Therefore, for example, a flow is formed so as to swirl around the central axis L within the second swirl chamber 33b or the first swirl chamber 33a due to the inertia force of the liquid that has flowed into the interior of the swirl chamber, and this flow is developed and becomes a swirl.

As described above, since the flow resistance between the main liquid chamber 14 and the auxiliary liquid chamber 15 through the swirl chamber unit 31 rises, a liquid preferentially flows through the limiting passage 44 between the main liquid chamber 14 and the auxiliary liquid chamber 15, liquid column resonance is produced within the limiting passage 44, and the shake vibration is absorbed and damped.

On the other hand, if an idle vibration is input to the vibration-damping device 10 in the direction of the principal axis O and the liquid pressure of the main liquid chamber 14 fluctuates, a liquid that flows into the second swirl chamber 33b or the first swirl chamber 33a through the flow regulation passage 34 is a little according to the amplitude of this idle vibration. Therefore, a swirl is not sufficiently developed within the second swirl chamber 33b or the first swirl chamber 33a, and, for example, as shown by a two-dot chain line in FIG. 6, a liquid that passes through the first and second swirl chambers 33a and 33b is not swirled or passes with a small amount of swirling. Therefore, the flow resistance between the main liquid chamber 14 and the auxiliary liquid chamber 15 through the swirl chamber unit 31 is suppressed to be low. Therefore, it is possible to actively circulate a liquid to the swirl chamber units 31, and resonance is produced within the flow regulation passage 34 and an idle vibration is absorbed and damped.

As described above, according to the vibration-damping device 10 based on the present embodiment, by providing the swirl chamber units 31 instead of a plunger member as in the related art, it is possible to absorb and damp both a shake vibration and an idle vibration having mutually different frequencies, and simplification of the structure of the vibration-damping device 10 and facilitation of the manufacture thereof can be achieved.

Additionally, since the first communication hole 32a allows the first swirl chamber 33a and the main liquid chamber 14 to communicate with each other and the second communication hole 32b allows the second swirl chamber 33b and the auxiliary liquid chamber 15 to communicate with each other, the aforementioned effects are obtained with respect to both of a liquid that flows from the main liquid chamber 14 through the swirl chamber unit 31 toward the auxiliary liquid chamber 15 and a liquid that flows from the auxiliary liquid chamber 15 through the swirl chamber unit 31 toward the main liquid chamber 14, and devices to which the vibration-damping device 10 is applicable can be prevented from being restricted.

Additionally, the flow regulation passage 34 allows the swirl chambers 33a and 33b to communicate with each other, and opens to the first swirl chamber 33a and the second swirl chamber 33b toward the circumferential directions of the respective swirl chambers 33a and 33b. Since the flow regulation passage 34 opening into the first and second swirl chambers 33a and 33b is common, it is possible to make the swirl chamber units 31 compact, for example, compared to a configuration in which a flow regulation passage allowing the first swirl chamber 33a and the auxiliary liquid chamber 15 to communicate with each other and a flow regulation passage allowing the second swirl chamber 33b and the main liquid chamber 14 to communicate with each other are formed, respectively, and the partitioning member 16 can be prevented from being bulky.

Additionally, since the first and second swirl chambers 33a and 33b are arranged side by side in the partitioning member 16 that partitions the liquid chamber within the first attachment member 11 in the direction of the principal axis O so that their respective central axes L become parallel to the principal axis O, it is possible to reliably constrain the size of the swirl chamber units 31 in the direction of the principal axis O, and the partitioning member 16 can be prevented from being bulky in the direction of the principal axis O.

Additionally, since the first and second communication holes 32a and 32b open into the first and second swirl chambers 33a and 33b from the end surfaces 35a and 35b of the first and second swirl chambers 33a and 33b, it is possible to stably produce the swirling flow of a liquid within the first and second swirl chambers 33a and 33b, and the pressure loss of the liquid can be effectively increased.

Additionally, the first and second communication holes 32a and 32b are arranged coaxially with the respective central axes L of the first and second swirl chambers 33a and 33b. Therefore, it is possible to guarantee that the length in the swirling direction of the swirling flow of a liquid formed by the first and second swirl chambers 33a and 33b is long, thereby making it easy to cause the liquid to stay within the first and second swirl chambers 33a and 33b, and the pressure loss of the liquid can be more effectively increased.

In addition, the technical scope of the invention is not limited to the present embodiment, and various changes can be made without departing from the concept of the invention.

For example, in the present embodiment, the limiting passage 44 is formed in the partitioning member 16. However, the limiting passage 44 may not be formed.

In the vibration-damping device 10, the main liquid chamber 14 and the auxiliary liquid chamber 15 communicate with each other only through the swirl chamber units 31. When an ordinary vibration, such as a shake vibration or an idle vibration, is input, the plurality of swirl chamber units 31 are designed so that this vibration is absorbed and damped by the swirl chamber units 31, respectively.

That is, although the idle vibration has a relatively small amplitude and a relatively high frequency, the shake vibration has a low frequency but a large amplitude. Therefore, when such an ordinary vibration is input, both of the flow speed of a liquid that flows into the second swirl chamber 33b through the first communication hole 32a, the first swirl chamber 33a, and the flow regulation passage 34 from the main liquid chamber 14 and the flow speed of a liquid that flows into the first swirl chamber 33a through the second communication hole 32b, the second swirl chamber 33b, and the flow regulation passage 34 from the auxiliary liquid chamber 15 can be raised to fixed values or higher.

Therefore, by making the shape of the swirl chambers units 31 related to the present modification example different from the swirl chamber units 31 of the vibration-damping device 10 related to the present embodiment, even when any one vibration of a shake vibration and an idle vibration is input, a liquid from the flow regulation passage 34 can be swirled around the central axis L within any one swirl chamber 33b and 33b of the first swirl chamber 33a and the second swirl chamber 33a, as shown by two-dot chain lines in FIG. 4.

As a result, for example, the pressure loss of a liquid increases due to the viscous resistance of a liquid, an energy loss caused by forming a swirling flow, an energy loss caused by the friction between a liquid and the wall surface of one swirl chamber 33a or 33b, or the like, and accordingly vibration is absorbed and damped.

Here, as the flow rate of a liquid that flows into one swirl chamber 33a or 33b from the flow regulation passage 34 rises with a rise in the flow speed of the liquid, the interior of one swirl chamber 33a or 33b is filled with a swirling flow of the liquid, and if the liquid further flows into one swirl chamber 33a or 33b, the pressure loss of the liquid can be increased.

After that, the liquid swirled within the first swirl chamber 33a flows out of the first communication hole 32a, and flows into the main liquid chamber 14. Additionally, the liquid swirled within the second swirl chamber 33b flows out of the second communication hole 32b, and flows into the auxiliary liquid chamber 15.

Meanwhile, for example, a fine vibration or the like having a higher frequency and an extremely smaller amplitude than assumed, may be unintentionally input to the vibration-damping device 10. When such a fine vibration is input, since the flow speed of a liquid that flows into one swirl chamber 33a or 33b through the flow regulation passage 34 is low, swirling of the liquid within one swirl chamber 33a or 33b is suppressed as shown by the two-dot chain line in FIG. 6. In a case where the swirling flow of a liquid does not occur within one swirl chamber 33a or 33b, since the liquid simply passes through one swirl chamber 33a or 33b and flows smoothly, a rise in dynamic spring constant is suppressed.

As described above, according to the vibration-damping device 10 related to the present modification example, the swirling flow of a liquid is formed within one swirl chamber 33a or 33b, so that the pressure loss of the liquid can be increased and vibrations can be absorbed and damped. Thus, for example, when an ordinary vibration, such as an idle vibration or a shake vibration, is input, the vibration can be absorbed and damped according to the flow speed of the liquid, regardless of the frequency of the vibration. Therefore, simplification of structure and facilitation of manufacture can be achieved, absorbing and damping a plurality of kinds of vibrations with mutually different frequencies.

Additionally, a rise in dynamic spring constant is suppressed under a stage where flow speed is low and swirling of a liquid within one swirl chamber 33a or 33b is suppressed. Therefore, for example, when the flow speed of a liquid is lower than that when an ordinary vibration is input, such as when an unintended vibration, such as a fine vibration having a higher frequency and an extremely smaller amplitude than the ordinary vibration, is input, it is possible to suppress a rise in dynamic spring constant, and the product characteristics of this vibration-damping device can be easily guaranteed.

Here, in the above respective embodiments, both an idle vibration and a shake vibration are absorbed and damped. However, the invention is not limited to this. The invention may be appropriately applied to other configurations in which both vibrations including a first vibration and a second vibration having a higher frequency than the first vibration are absorbed and damped.

Additionally, in the present embodiment, the central axes L of the first and second swirl chambers 33a and 33b extend parallel to the principal axis O. However, the central axes may extend in the direction intersecting the principal axis O, or the respective central axes L of the first and second swirl chambers 33a and 33b may extend in mutually intersecting directions.

Additionally, in the present embodiment, the flow regulation passage 34 may extend in the direction parallel to the phantom line K, in the plan view seen from the direction of the principal axis O. For example, however, the flow regulation passage may extend in a direction intersecting the phantom line K.

Additionally, although a configuration in which the swirl chamber member 42 is split at the second-side end along the direction of the principal axis O is shown in the present embodiment, a position where the swirl chamber member 42 is split in the direction of the principal axis O may be appropriately changed, the swirl chamber member 42 may be split in three or more directions of the principal axis O, or the entire swirl chamber member 42 may be integrally formed.

Moreover, in the present embodiment, the main liquid chamber 14 is used as the first liquid chamber and the auxiliary liquid chamber 15 is used as the second liquid chamber. However, the invention is not limited to this. For example, appropriate changes may be made, such as using the auxiliary liquid chamber as the first liquid chamber and using the main liquid chamber as the second liquid chamber.

Additionally, in the present embodiment, the partitioning member 16 partitions the liquid chamber within the first attachment member 11 into the main liquid chamber 14 having the elastic body 13 on a portion of the wall surface thereof, and the auxiliary liquid chamber 15. However, the invention is not limited to this. For example, a pair of elastic bodies in the direction of the principal axis instead of the diaphragm, or a pressure-receiving liquid chamber having an elastic body on a portion of the wall surface thereof may be provided instead of providing the auxiliary liquid chamber. That is, the partitioning member may be appropriately changed to another configuration in which the liquid chamber within the first attachment member in which a liquid is enclosed is split into the first liquid chamber and the second liquid chamber, and at least one of both the liquid chambers of the first liquid chamber and the second liquid chamber has an elastic body on a portion of the wall surface thereof.

Additionally, the liquid chamber may be partitioned in the direction intersecting the principal axis O by the partitioning member 16.

Additionally, in the present embodiment, the flow regulation passage 34 extends straight in the plan view as seen from the direction of the principal axis O. However, the invention is not limited to this. For example, appropriate changes may be made by curving or bending the flow regulation passage.

Additionally, although a case where an engine is connected to the second attachment member 12 and the first attachment member 11 is connected to a vehicle body has been described in the present embodiment, contrary to this, the engine may be connected to the first attachment member 11 and the second attachment member 12 may be connected to the vehicle body.

Additionally, although engine mounts of vehicles has been shown in the present embodiment, the invention can also be applied to those other than the engine mounts. For example, it is also possible to apply the invention to mounts for power generators loaded on construction machines. Otherwise, it is also possible to apply the invention to mounts of machines installed in factories or the like.

In addition, the constituent elements in the present embodiment can be substituted with well-known constituent elements without departing from the concept of the invention, and the above embodiment may be appropriately combined.

INDUSTRIAL APPLICABILITY

According to the vibration-damping device of the invention, simplification of structure and facilitation of manufacture can be achieved, taking advantage of product characteristics.

REFERENCE SIGNS LIST

10: VIBRATION-DAMPING DEVICE
11: FIRST ATTACHMENT MEMBER
12: SECOND ATTACHMENT MEMBER
13: ELASTIC BODY
14: MAIN LIQUID CHAMBER (FIRST LIQUID CHAMBER)

15: AUXILIARY LIQUID CHAMBER (SECOND LIQUID CHAMBER)
16: PARTITIONING MEMBER
31: SWIRL CHAMBER UNIT
32a: FIRST COMMUNICATION HOLE
32b: SECOND COMMUNICATION HOLE
33a: FIRST SWIRL CHAMBER
33b: SECOND SWIRL CHAMBER
34: FLOW REGULATION PASSAGE
35a, 35b: END SURFACE
44: LIMITING PASSAGE
L: CENTRAL AXIS

What is claimed is:

1. A vibration-damping device comprising:
a tubular first attachment member coupled to any one of a vibration generating part and a vibration receiving part, and a second attachment member coupled to the other thereof;
an elastic body coupling both of the attachment members;
a partitioning member that partitions a liquid chamber within the first attachment member having a liquid enclosed therein into a first liquid chamber and a second liquid chamber,
wherein at least any one of the two liquid chambers of the first liquid chamber and the second liquid chamber has the elastic body on a portion of the wall surface thereof,
wherein a swirl chamber unit allowing the first liquid chamber and the second liquid chamber to communicate with each other is formed in the partitioning member,
wherein the swirl chamber unit includes:
a first communication hole opening to the first liquid chamber, and a second communication hole opening to the second liquid chamber;
a first swirl chamber communicating with the first liquid chamber only via the first communication hole, and a second swirl chamber communicating with the second liquid chamber only via the second communication hole; and
a flow regulation passage that allows the first swirl chamber and the second swirl chamber to communicate with each other in a direction perpendicular to an axis direction of the first attachment member and opens to the swirl chambers in circumferential directions of the respective swirl chambers,
wherein the first and second swirl chambers are formed so that a liquid flowing into the interiors of the chambers from the flow regulation passage is swirled according to the flow speed of the liquid,
wherein one set of swirl chamber units is arranged so that, in a plan view as seen from the direction of a principal axis of the vibration-damping device, peripheral surface portions of the first or second swirl chambers on the opposite sides of the flow regulation passages in the respective swirl chamber units face each other and the flow regulation passages in the respective swirl chamber units become parallel to each other, and
wherein one set of swirl chamber units are arranged in the partitioning member such that their positions in a direction in which the flow regulation passages extend are shifted from each other.

2. The vibration-damping device according to claim 1,
wherein the partitioning member partitions the liquid chamber in the axis direction of the first attachment member, and
wherein the first and second swirl chambers are arranged side by side in the partitioning member so that respective central axes thereof become parallel to the axis of the first attachment member.

3. The vibration-damping device according to claim 1,
wherein the first and second communication holes open into the first and second swirl chambers from end surfaces that face central axis directions of the respective swirl chambers, among wall surfaces that define the first and second swirl chambers.

4. The vibration-damping device according to claim 1,
wherein the first and second communication holes are arranged coaxially with central axes of the respective first and second swirl chambers.

5. The vibration-damping device according to claim 1,
wherein the partitioning member is provided with a limiting passage that allows both of the liquid chambers to communicate with each other and has a resonant frequency equal to the frequency of the first vibration, and
wherein the resonant frequency of the flow regulation passage is equal to the frequency of the second vibration having a higher frequency than the first vibration.

6. The vibration-damping device according to claim 1,
wherein the first communication hole extends entirely in the axis direction of the first attachment member from the first liquid chamber to the first swirl chamber, and
wherein the second communication hole extends entirely in the axis direction of the first attachment member from the second liquid chamber to the second swirl chamber.

* * * * *